No. 742,027. PATENTED OCT. 20, 1903.
J. HIRST.
PROCESS OF MANUFACTURING GLASS.
APPLICATION FILED JUNE 12, 1903.
NO MODEL.

Witnesses:—
Chas. W. Cox.
Herman E. Metius

Inventor:
James Hirst,
by his Attorneys, Howson & Howson.

THE NORRIS PETERS CO., PHOTO-LITHO., WASHINGTON, D. C.

No. 742,027. Patented October 20, 1903.

UNITED STATES PATENT OFFICE.

JAMES HIRST, OF VINELAND, NEW JERSEY.

PROCESS OF MANUFACTURING GLASS.

SPECIFICATION forming part of Letters Patent No. 742,027, dated October 20, 1903.

Application filed June 12, 1903. Serial No. 161,223. (No model.)

*To all whom it may concern:*

Be it known that I, JAMES HIRST, a citizen of the United States, and a resident of Vineland, Cumberland county, New Jersey, have invented certain Improvements in Processes of Manufacturing Glass, of which the following is a specification.

My invention relates to the manufacture of plate and window glass; and it consists of an improved method or process of producing such glass directly in sheet form without the preliminary blowing or shaping of the glass in cylindrical form.

Two forms of apparatus applicable for use in carrying out my invention are shown in the accompanying drawings, in which—

Figure 1:
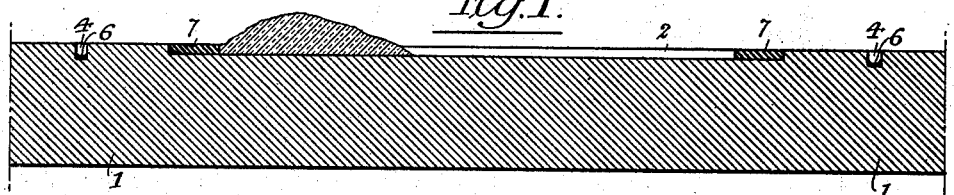
Figure 2:
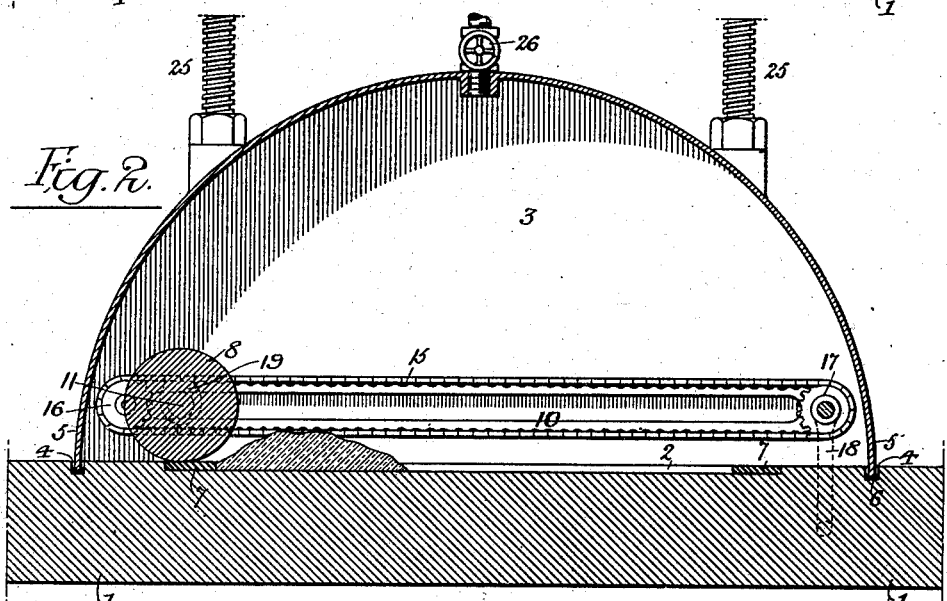
Figure 3:
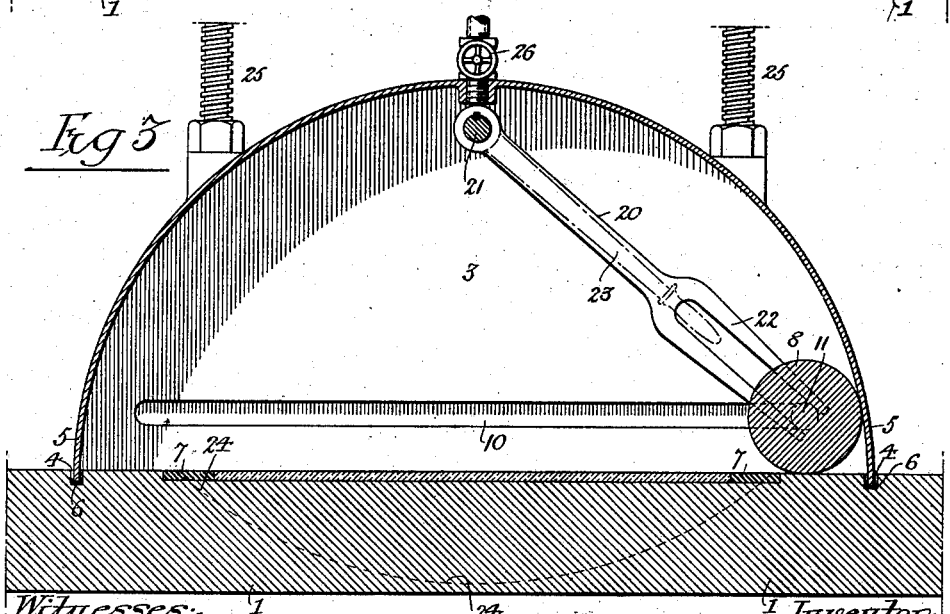

Figure 1 is a sectional view of a part of the apparatus employed in carrying out my invention, showing the glass in the first stage of my improved process or method of manufacture. Fig. 2 is a similar sectional view illustrating another portion of the apparatus and the next step in the manufacture of glass according to my improved process; and Fig. 3 is a similar sectional view of another form of apparatus, illustrating the last step in the process.

Heretofore in the manufacture of sheet or window glass it has been necessary to blow, either manually or with the aid of a machine, cylinders of glass which are afterward cut and split. After this has been done the split cylinders are sent to the flatting machine or oven to be flattened, after which they are passed through a leer to be tempered. This method of making glass has always been a difficult and expensive process, and the percentage of first-class material has not been very high. In the manufacture of plate-glass the plates are formed by rolling masses of glass upon a suitable table, which plates after tempering require a very considerable amount of grinding to provide desirable "firsts." By my improved process the difficulties formerly met with in the manufacture of glass of this character have been overcome, and I am able to produce at much less cost and with less labor glass of a quality equal to the finest plate and window glass manufactured under the most favorable conditions according to the present methods.

My process consists in pouring the glass onto a mold table or bed having a perfectly-level top with a true plane surface, which is preferably highly polished. After the glass has been placed on this table I cause an airtight shell or cover to descend and inclose the entire surface of the mold table or bed and the glass carried by the same. This cover carries a roller of sufficient weight to roll the glass on the mold table or bed to a predetermined thickness, and I prefer to carry out this rolling operation under air-pressure. The roller is passed from one end of the table to the other one or more times, as may be necessary, and the glass is thereby evenly spread over the entire surface of such table, which is preferably recessed, as shown. I regulate the thickness of the plate by the depth of the recess, and to facilitate the removal of the sheet of glass I may employ a frame fitting the walls of this recess. After this has been done I increase the air-pressure within the shell or cover to the highest possible point, and this pressure being directed evenly over the entire surface of the glass causes the same to be pressed in a firm and even manner on the metal table, receiving thereby from the even pressure of air on one side and the polished surface of the table on the other a true smooth surface which requires no subsequent rubbing or other treatment. The mold table or bed is preferably heated before the glass is placed upon the same to insure the plasticity of the glass. After the sheet of glass has been rolled it may be removed in any suitable manner.

In the accompanying drawings, 1 represents the table or bed, preferably mounted on a firm solid base, 2 the recessed portion of the same in which the sheet of glass is formed, and 3 the air-tight shell or cover, preferably square in section, which is caused to descend and inclose the surface of the table and the glass spread upon the same. The table is provided with a groove 4, adapted to receive the edges 5 of this cover, and this groove is provided with any suitable form of packing material (indicated at 6) in order that an air-tight joint may be maintained at this point. The weight of the shell or cover and the means whereby it is held down are sufficient to keep the joint tight. By preference I employ a frame 7 surrounding the recessed portion of the table, which frame may be removed after the glass has been rolled and will thereby provide a space to facilitate the removal of the sheet of glass. The roller 8 is carried by the cover 3, the sides of the same being grooved at 10 to support and guide the end spindles 11 of the roller, and this roller may be moved across the bed or table in any suitable manner. In the drawings I have shown two forms of mechanism for accomplishing this result. In Fig. 2 a chain 15 is employed to move the roller 8, such chain passing over sprocket-wheels 16 and 17, mounted at opposite ends of the shell or cover 3, one of such sprocket-wheels being driven by means of a handle 18. (Shown in dotted lines.) By preference a chain is mounted on each side of the cover. These chains carry collars or depending members 19, arranged to engage the spindles 11 of the roller, and by this means the roller may be moved back and forth as the chains are traversed, the spindles of the same turning in the collars or depending members 19. In Fig. 3 I have shown a pendulum-arm 20, pivotally mounted on a cross-shaft 21, which is arranged to be rocked so as to move this pendulum-arm (and another mounted on the opposite end of the shaft and not shown) back and forth. These pendulum-arms have forked ends 22 arranged to engage the spindles 11 of the roller, whereby the latter may be moved across the table. The shaft 21, carrying the pendulum-arm, is oscillated by means of a handle 23. (Shown in dotted lines.) In order to permit the passage of the pendulum-arms past the center of the mold table or bed, the latter is slotted at 24, as clearly shown in Fig. 3.

The shell or cover 3 carries threaded members 25, by means of which it is lowered onto the mold table or bed with the aid of other suitable mechanism. At the center of the top of this shell connection is made with a tube leading from the source of air-pressure, and a valve 26 is employed to control the same. In lieu of this arrangement several inlets may be provided for the air under pressure, as may be desirable or expedient.

Instead of arranging the shell or cover to be bodily raised from the mold table or bed it may be raised slightly and then moved to one side. The bed also may be movable from under the shell or cover, and a series of beds may be employed to which such shell or cover may be moved to perform the necessary operations.

Having thus described my invention, I claim and desire to secure by Letters Patent—

1. The process of manufacturing sheet-glass, which consists in pouring a mass of glass onto a suitable table or bed, placing a cover over the same, rolling said glass, and then introducing air-pressure to act upon the surface of the glass and press the same evenly upon the surface of the table.

2. The process of manufacturing sheet-glass, which consists in pouring a mass of glass onto a suitable mold table or bed, rolling said glass under air-pressure, and then increasing such pressure to act upon the entire surface of the glass and press the same evenly upon the surface of the table.

3. The process of manufacturing sheet-glass, which consists in pouring a mass of glass onto a suitable mold table or bed upon which it is formed, causing an air-tight cover to inclose said glass, rolling said glass when so covered under air-pressure, and then increasing the pressure so as to cause the glass to be pressed in a flat smooth sheet on the surface of the table.

4. The process of manufacturing sheet-glass, which consists in providing a heated mold table or bed having a smooth polished surface, pouring a mass of glass onto said table, rolling said glass upon the surface of the mold-table under confined air-pressure, and then increasing the pressure so as to act upon the entire surface of the glass and press it upon the smooth surface of the table until it becomes set.

In testimony whereof I have signed my name to this specification in the presence of two subscribing witnesses.

JAMES HIRST.

Witnesses:
  MURRAY C. BOYER,
  JAMES C. KRAYER.